United States Patent
Bavishi et al.

(10) Patent No.: US 11,163,486 B2
(45) Date of Patent: Nov. 2, 2021

(54) MEMORY SUB-SYSTEM-BOUNDED MEMORY FUNCTION

(71) Applicant: Micron Technology, Inc., Boise, ID (US)

(72) Inventors: Dhawal Bavishi, San Jose, CA (US); Robert Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 72 days.

(21) Appl. No.: 16/694,427

(22) Filed: Nov. 25, 2019

(65) Prior Publication Data

US 2021/0157510 A1 May 27, 2021

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0679; G06F 3/0604
See application file for complete search history.

(56) References Cited

U.S. PATENT DOCUMENTS

| | | | | |
|---|---|---|---|---|
| 5,432,729 | A * | 7/1995 | Carson | H01L 25/0657 257/673 |
| 7,293,138 | B1 * | 11/2007 | Mahmoud | G06F 11/1076 711/104 |
| 10,394,760 | B1 * | 8/2019 | Kochan | G06F 3/0608 |
| 2005/0060506 | A1 * | 3/2005 | Higaki | G06F 11/1456 711/162 |
| 2013/0042119 | A1 * | 2/2013 | Bennett | G06F 13/4247 713/300 |
| 2014/0059277 | A1 * | 2/2014 | Chung | G06F 3/0664 711/103 |
| 2017/0177243 | A1 * | 6/2017 | Trika | G06F 11/2094 |
| 2017/0322726 | A1 * | 11/2017 | Walker | G06F 13/1626 |
| 2019/0163621 | A1 * | 5/2019 | Doh | G06F 3/064 |
| 2019/0267100 | A1 * | 8/2019 | Pan | G11C 16/26 |
| 2020/0043444 | A1 * | 2/2020 | Lambert | G09G 5/39 |

* cited by examiner

*Primary Examiner* — Sean D Rossiter
(74) *Attorney, Agent, or Firm* — Schwegman Lundberg & Woessner, P.A.

(57) ABSTRACT

Various embodiments described herein provide for execution of a memory function within a memory sub-system. For example, some embodiments provide for execution of certain memory-related functions internally within the memory sub-system, at the request of a host system, using one or more memory access operations (e.g., direct memory access operations) performed internally within the memory sub-system.

19 Claims, 12 Drawing Sheets

MEMORY SUB-SYSTEM-BOUNDED MEMORY FUNCTION

TECHNICAL FIELD

Embodiments of the disclosure relate generally to memory sub-systems, and more specifically, relate to a memory function executed within a memory sub-system.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
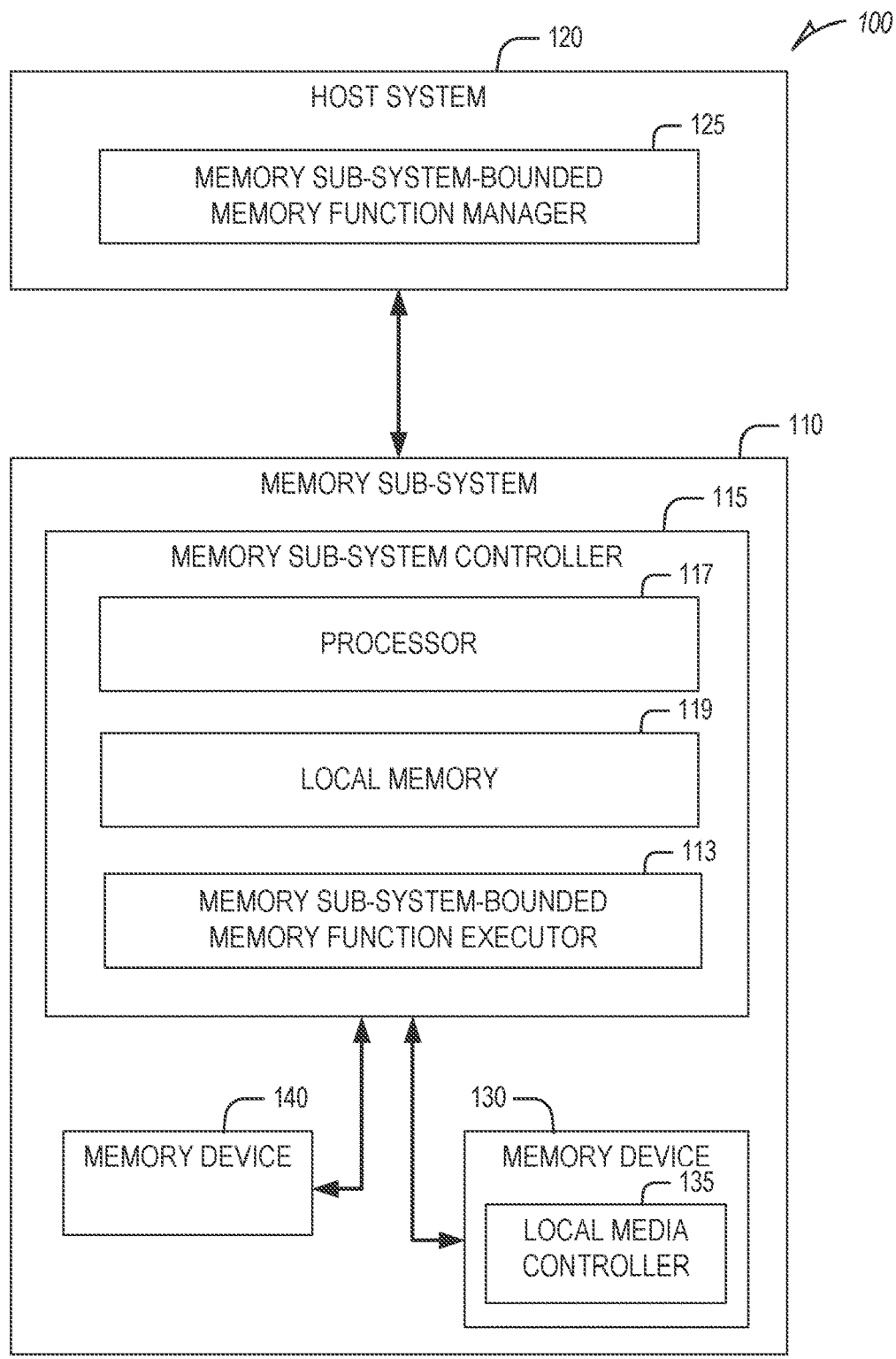
FIG. 1 illustrates an example computing environment that includes a memory sub-system in accordance with some embodiments of the present disclosure.

Aspects of the present disclosure are directed to executing a memory function within a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

Traditionally, execution of certain memory-related functions by a host system, with respect to a memory sub-system, involve multiple operations being performed at the host system to achieve the intended results of the memory-related functions. For instance, certain memory-related functions (hereafter, memory functions), such as memory copy (memcpy), memory move (memmove), memory set (memset), memory compare (memcmp), memory data search (memchr), and others supported by GNU C Library (glibc), involve a host system reading data from the memory sub-system, and processing the data at the host system (e.g., writing data back to the memory sub-system) to achieve the intended results of those memory-related functions.

Aspects of the present disclosure address the above and other deficiencies by having a memory sub-system (e.g., non-volatile dual in-line memory module (NVDIMM) device) execute certain memory-related functions internally within the memory sub-system, at the request of a host system, using one or more memory access operations (e.g., direct memory access operations) performed internally within the memory sub-system. For instance, various embodiments provide a method for executing a memory-related function within a memory sub-system by copying and transferring data (e.g., physical page frames) within a memory sub-system (e.g., using one or more direct memory access operations performed internally within the memory sub-system). At the request of a host system (e.g., request via a memory sub-system command to a memory sub-system), the memory sub-system can internally execute a memory function, by performing one or more internal memory access operations (e.g., internal direct memory access operations), without involvement of/interaction with a host system (e.g., without a direct memory access operation by the host system). As used herein, a memory access operation can include a read operation or a write operation. Additionally, as used herein, a memory function executed internally within a memory sub-system as described herein can be referred to as a memory sub-system-bounded memory function.

By use of various embodiments described herein, a memory function (e.g., a memory function traditionally supported by glibc, such as memory copy, memory move, memory set, memory compare, and memory search) requested by a host system can be performed by a memory sub-system (on behalf of the host system) with less involvement by the host system (e.g., without direct memory access operations being performed between the host system with respect to the memory sub-system). For some embodiments, certain memory functions are performed by the memory sub-system more efficiently and quickly than traditional techniques for executing the same memory functions, as the number of data transfers performed between the host system and the memory sub-system during execution of those memory functions are reduced. Additionally, by leveraging various resources of the memory sub-system to execute certain memory functions, some embodiments reduce resource usage on the host system when executing those memory functions.

Disclosed herein are some examples of systems that execute a memory function within a memory sub-system, as described herein.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein. "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes negative- and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as NAND type flash memory are described, the memory device 130 can be based on any other type of non-volatile memory, such as read-only memory (ROM), phase change memory (PCM), magneto random access memory (MRAM), negative-or (NOR) flash memory, electrically erasable programmable read-only memory (EEPROM).

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs. MLCs. TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a memory sub-system-bounded memory function executor 113 that can enable the memory sub-system 110 to perform a memory function in accordance with various embodiments. In some embodiments, the memory sub-system controller 115 includes at least a portion of the memory sub-system-bounded memory function executor 113. For example, the memory sub-system controller 115 can include a processor 117 (processing device) configured to execute instructions stored in local memory 119 for performing the operations described herein. In some embodiments, the memory sub-system-bounded memory function executor 113 is part of the host system 110, an application, or an operating system.

The host system 120 includes a memory sub-system-bounded memory function manager 125 that can receive a request to perform a memory function (hereafter, requested memory function) with respect to at least one memory sub-system operatively coupled to the host system 120, such the memory sub-system 110. The memory function manager 125 can determine whether the requested memory function is to be performed with respect to only a single memory sub-system coupled to the host system 120 (e.g., just the memory sub-system 110) or is to be performed with respect to two or more memory sub-systems operatively coupled to the host system 120 (e.g., more than just memory sub-system 110). For instance, the single memory sub-system (e.g., 110) can comprise a single NVDIMM device, such as a single NVDIMM-P device. For some embodiments, the memory sub-system-bounded memory function manager 125 makes this determination based on one or more memory addresses associated (e.g., provided) with the requested memory function (e.g., one or more memory addresses with which the requested memory function is to be performed). For example, the one or more memory addresses provided with the requested memory function can indicate that (e.g., map to) only the memory sub-system 110 is involved in performance of the requested memory function, or can indicate that (e.g., map to) two or more memory sub-systems are involved in the performance of the requested memory function.

Where memory function manager 125 determines the requested memory function is to be performed with respect to only the memory sub-system 110 (e.g., bounded to the memory sub-system 110), the memory function manager 125 can send (or cause the sending of) a memory sub-system command to the memory sub-system 110 (e.g., in accordance with a non-deterministic memory protocol, such as a NVDIMM-P memory protocol), where the memory sub-system command requests the memory sub-system 110 to perform the requested memory function with respect to a set of addresses associated with (e.g., that map to) the memory sub-system 110. As described herein, the memory sub-system 110 can be configured (e.g., via the memory sub-system-bounded memory function executor 113 of the memory sub-system controller 115) to perform the memory function as described herein.

Eventually, when performance of the memory function by the memory sub-system 110 ends, the memory sub-system-bounded memory function manager 125 can receive a response (e.g., RSP_n in accordance with a NVDIMM-P memory protocol) from the memory sub-system 110 that indicates a performance status of the memory function (e.g., performance of memory function completed successfully or failed). For instance, depending on the memory function being performed, the response can indicate that performance of the memory function ended and, as such, that data resulting from performance of the memory function is ready for retrieval by the memory sub-system-bounded memory function manager 125. The data can vary based on the requested memory function. For instance, the data can comprise data indicating whether the memory function was successfully performed, delta data generated by the requested memory function (e.g., where the requested memory function comprises a memory compare), or index data generated by the requested memory function (e.g., where the requested memory function comprises a memory search). Subsequently, data retrieved by the memory sub-system-bounded memory function manager 125 can be provided to the host system 120 (e.g., provided to the software that originally requested performance of the requested memory function).

Depending on the embodiment, the memory sub-system-bounded memory function manager 125 can be implemented as a software layer of the host system 120, which can be a part of an operating system or a driver used by the host system 120 to interact (e.g., interface) with the memory sub-system 110. The memory sub-system-bounded memory function manager 125 can be responsible for causing the allocation and deallocation of memory space associated with memory addresses operated upon by requested memory functions. For instance, where a requested memory request comprises a memory move function, the memory sub-system-bounded memory function manager 125 can cause the deallocation of memory space associated with the source memory address after transfer of data from the source memory address to the destination memory address has completed (e.g., once a RSP_n signal is received from the memory sub-system 110 in accordance with a NVDIMM-P memory protocol).

The memory sub-system 110 includes a memory sub-system-bounded memory function executor 113 that enables or facilitates execution of a memory function (e.g., memory copy, memory move, memory set, memory compare, and memory search), requested by the host system 120, within the memory sub-system 110 in accordance with various embodiments described herein, where the execution includes performing a set of memory access operations internally within the memory sub-system 110 (e.g., without direct memory access operations by the host system 120). In this way, a memory function executed internally within a memory sub-system can be regarded as a memory sub-system-bounded memory function, as its execution is bounded to operations performed within the memory sub-system 110. In some embodiments, the memory sub-system controller 115 includes at least a portion of the memory sub-system-bounded memory function executor 113. For example, the memory sub-system controller 115 can include a processor 117 (processing device) configured to execute instructions stored in local memory 119 for performing the operations described herein. In some embodiments, the memory sub-system-bounded memory function executor 113 is part of the host system 120, an application, or an operating system.

The memory sub-system-bounded memory function executor 113 can receive a request to perform, internally within the bounds of the memory sub-system 110, a memory function for the host system 120. The request can be sent from the host system 120 to the memory sub-system 110 by way of one or more memory sub-system commands from the host system 120 to the memory sub-system 110, where the memory sub-system commands can request or instruct the memory sub-system 110 to perform a specific memory function (e.g., memory copy, memory move, memory set, memory compare, and memory search) with respect to one or more specific memory addresses of the memory sub-system 110. For instance, the requested memory function can be requested with respect to a set of memory addresses of the memory sub-system 110 that maps to at least one memory device (e.g., 130, 140) of the memory sub-system 110. Depending on the memory function being requested, the host system 120 can provide for (or specify) one or more parameters for the requested memory function, such as a source memory address, a destination memory address, a start memory address, a stop memory address, search data, a data length, and the like.

For some embodiments, the one or more memory sub-system commands used to send the request (for the memory function) from the host system 120 to the memory sub-system 110 can be according to a non-deterministic memory protocol, such as a Non-Volatile Dual In-Line Memory Module-P (NVDIMM-P) memory protocol. Depending on the embodiment, one or more new memory sub-system commands may be added to a memory protocol (e.g., non-deterministic memory protocol) to request a memory sub-system-bounded memory function described herein. For instance, a new command can be added to the NVDIMM-P protocol for requesting a memory sub-system-bounded memory function described herein (e.g., one new command for each of memory copy, memory move, memory set, memory compare, and memory search) be performed by the memory sub-system 110, and the memory sub-system 110 can provide a NVDIMM-P response (e.g., on RSP_n) upon the performance of the memory sub-system-bounded memory function ending. A new command that corresponds to a memory sub-system-bounded memory function can be implemented with respect to a memory protocol (e.g., a NVDIMM-P memory protocol) using a command encoding of the memory protocol not currently being used by the memory protocol or using bits on a command bus not currently being used.

Alternatively, one or more existing commands of a memory protocol can be used to request a memory sub-system-bounded memory function described herein. For instance, one or more NVDIMM-P write commands (e.g., XWRITE commands) can be used to write, to a set of registers of the memory sub-system 110 (e.g., reserved memory space on the memory sub-system 110 that map to one or more internal registers of the memory sub-system controller 115), a request to perform a memory sub-system-bounded memory function. The data written to the set of registers can include, without limitation, data specifying which memory sub-system-bounded memory function is to be performed, a source memory address, a destination memory address, a start memory address, a data length, and the like. The memory sub-system 110 can detect (e.g., read) the information stored in the set of registers, and respond by performing the memory sub-system-bounded memory function accordingly. The memory sub-system 110 can then provide a NVDIMM-P response (e.g., on RSP_n) upon the performance of the memory sub-system-bounded memory function ending.

The memory sub-system-bounded memory function executor 113 can perform the requested memory function within the memory sub-system 110 by accessing (e.g., reading data from or writing data to) the at least one memory device using a set of memory access operations performed internally within the memory sub-system 110. The set of memory access operations performed by the memory sub-system-bounded memory function executor 113 can comprise at least one direct memory access operation.

Eventually, upon determining that the performance of the requested memory function within the memory sub-system 110 has ended, memory sub-system-bounded memory function executor 113 can send (or cause the sending of) a response to the host system 120 that indicates a performance status for the memory function (e.g., completed successfully or ended unsuccessfully). Depending on the embodiment, the response from the memory sub-system 110 to the host system 120 can be according to a non-deterministic memory protocol (e.g., NVDIMM-P memory protocol), which can be similar to the one used to send the one or more memory sub-system from the host system 120 to the memory sub-system 110.

Examples of memory sub-system-bounded memory functions that can be requested via the memory sub-system-bounded memory function executor 113 can include, without limitation, memory copy, memory move, memory set, memory compare, or memory search. For instance, the memory sub-system-bounded memory function can comprise a memory copy function that requests the memory sub-system 110 to copy data from a source memory address of the memory sub-system 110 (e.g., mapping to the memory device 130) to a destination memory address of the memory sub-system 110 (e.g., mapping to the memory device 140).

Performing the memory copy function can comprise the memory sub-system 110 performing a set of memory access operations that includes: a first subset of memory access operations (e.g., direct memory access (DMA) operations performed within the memory sub-system 110) to read a portion of the data from the source memory address; and a second subset of memory access operations (e.g., internal DMA operations performed within the memory sub-system 110) to write the portion of the data to the destination memory address. The portion of data read from the source memory address can be copied to the local memory 119 of the memory sub-system controller 115, and then copied from the local memory 119 to the destination memory address. The source memory address and the destination memory address can map to a single memory device (e.g., 130) of the memory sub-system 110. Alternatively, the source memory address can map to a first memory device (e.g., 130) of the memory sub-system 110, and the destination memory address maps to a second memory device (e.g., 140) of the memory sub-system 110.

As another example, the memory sub-system-bounded memory function can comprise a memory move function between a source memory address and a destination memory address, which can comprise the memory sub-system 110 performing a memory copy function and then "invalidating" the copied data at the source destination memory address. For some embodiments the copied data is invalidated by the memory sub-system-bounded memory function executor 113 (or the memory sub-system-bounded memory function manager 125) causing the memory space associated with the source memory destination to be deallocated.

As another example, the memory sub-system-bounded memory function can comprise a memory set function that requests the memory sub-system 110 to fill a block of memory space, starting at a destination memory address of the memory sub-system 110, with data specified by the memory sub-system command. Performing the memory set function can comprise the memory sub-system 110 performing a set of memory access operations that includes a memory access operation to write at least a portion of the data to the destination memory address.

As another example, the memory sub-system-bounded memory function can comprise a memory compare function that requests the memory sub-system 110 to compare first data, being stored starting at a first memory address of the memory sub-system 110, to second data, being stored starting at a second memory address of the memory sub-system 110. Performing the memory compare function can comprise the memory sub-system 110 performing a set of memory access operations that includes: a first memory access operation to read the first data from the first memory address; and a second memory access operation to read the second data from the second memory address. The first data and the second data can be copied to the local memory 119 of the memory sub-system controller 115, and the processor 117 can perform a comparison of the first and second data stored in the local memory 119. A delta data generated by the memory compare function can be stored to the local memory 119, and can be retrieved by the host system 120 (e.g., the memory sub-system-bounded memory function executor 113) from the local memory 119 after the host system 120 has received a response indicating that performance of the memory compare function has ended.

As another example, the memory sub-system-bounded memory function can comprise a memory search function that requests the memory sub-system 110 to search for data specified by the memory sub-system command, where the search starts at a source memory address of the memory sub-system 110. The source memory address for the memory search function can represent the start of a window of address space that will be searched by the memory search function. Performing the memory search function can comprise the memory sub-system 110 performing a set of memory access operations that includes a memory access operation to read data from the source memory address. The data read from the memory sub-system 110 can be stored in the local memory 119 of the memory sub-system controller 115, and the stored data can be compared to the specified data. Where the specified data is located within the memory sub-system 110 by the memory search function, the memory sub-system 110 can generate an index value (relative to the start memory address) indicating where the located data is stored within the memory sub-system 110. This index value can be stored to the local memory 119, and can be retrieved by the host system 120 (e.g., the memory sub-system-bounded memory function executor 113) from the local memory 119 after the host system 120 has received a response indicating that performance of the memory search function has ended.

As another example, the memory sub-system-bounded memory function can comprise a memory reverse search function that requests the memory sub-system 110 to search for data specified by the memory sub-system command, where the search starts at a source memory address of the memory sub-system 110 but the search is performed in reverse order from the memory search function (e.g., memory addresses are searched in decremental order). Accordingly, the source memory address for the memory reverse search function can represent the end of a window of address space that will be searched by the memory search function.

Further details with regards to the operations of the memory sub-system-bounded memory function executor 113 and the memory sub-system-bounded memory function manager 125 are described below.

Figure 2:
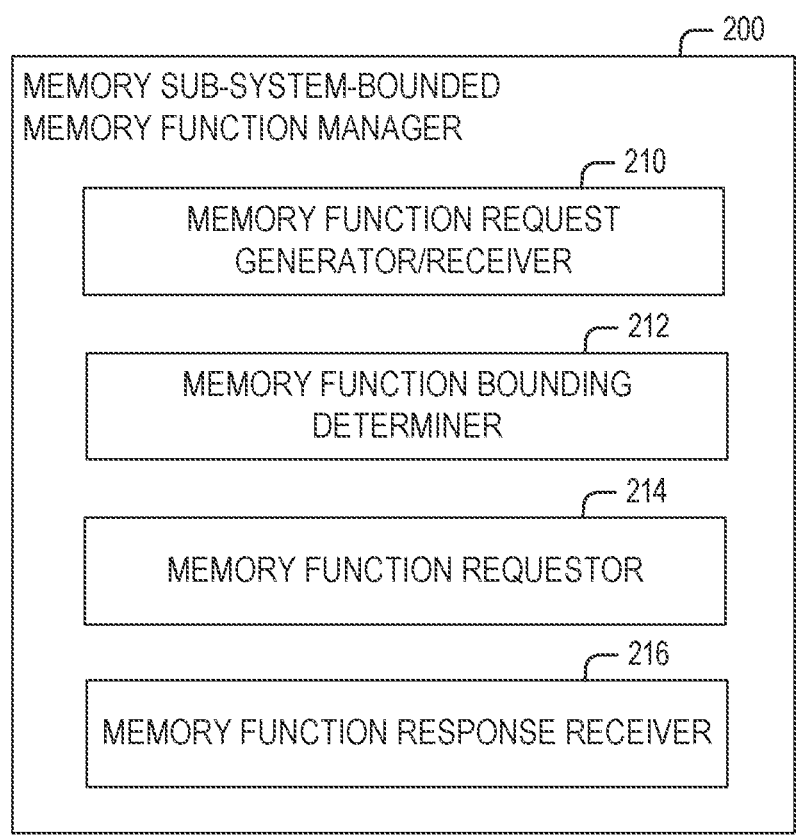
FIG. 2 is a block diagram of an example memory sub-system-bounded memory function manager, in accordance with some embodiments of the present disclosure.

FIG. 2 is a block diagram of an example memory sub-system-bounded memory function manager 200, in accordance with some embodiments of the present disclosure. As shown, the memory sub-system-bounded memory function manager 200 includes a memory function request generator/receiver 210, a memory function bounding determiner 212, a memory function requestor 214, and a memory function response receiver 216. For some embodiments, the memory sub-system-bounded memory function manager 200 is implemented as part of an operating system or a driver (e.g., memory sub-system driver) operating on a host system (e.g., 120). Additionally, for some embodiments, the composition of a memory sub-system-bounded memory function manager can vary from what is illustrated with respect to FIG. 2.

For some embodiments, the memory function request generator/receiver 210 generates or receives a request to perform a memory function with respect to at least one memory sub-system operatively coupled to the host system. The memory function bounding determiner 212 determines whether the memory function is to be performed with respect to only a single memory sub-system (e.g., a single NVDIMM-P device, which can be represented by 110) coupled to the host system or is to be performed with respect to two or more memory sub-systems (e.g., multiple NVDIMM-P devices) operatively coupled to the host system. In response to determining that the memory function is to be performed with respect to only a single memory sub-system (e.g., memory function bounded to a single memory sub-system), the memory function requestor 214 sends (or causing the sending of) a memory sub-system command to the single memory sub-system (e.g., in accordance with a non-deterministic memory protocol, such as a NVDIMM-P memory protocol) that requests the single memory sub-system to perform the memory function with respect to a set of addresses associated with (e.g., that map to) the single memory sub-system. The memory function response receiver 216 receives a response (e.g., RSP_n in accordance with a NVDIMM-P memory protocol) from the memory sub-system (e.g., 110) that indicates a performance status of the memory function (e.g., performance of memory function completed successfully or failed).

Figure 3:
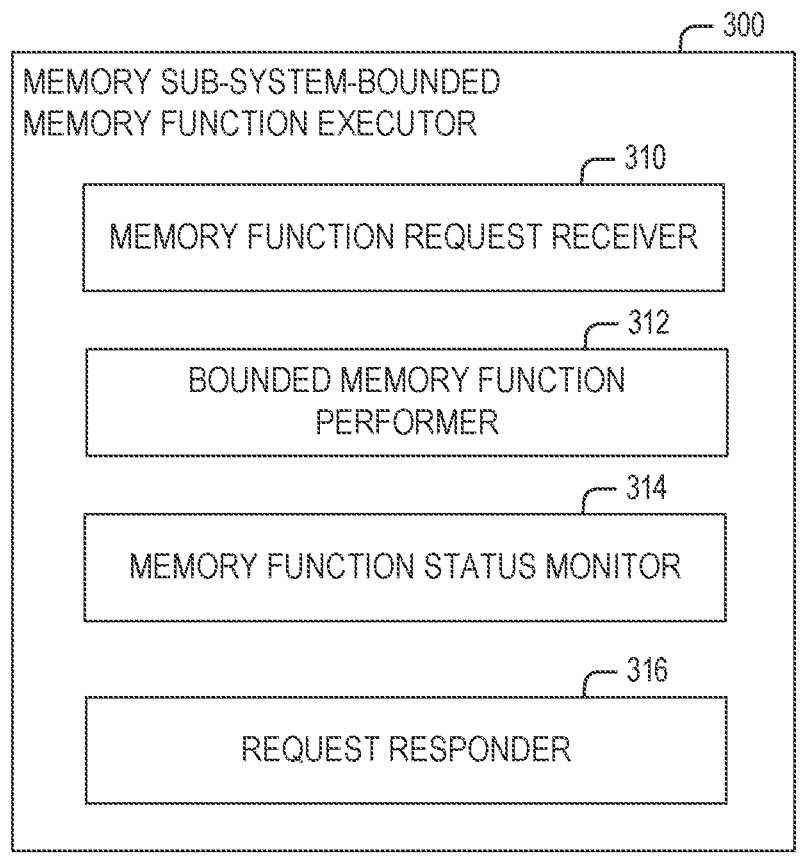
FIG. 3 is a block diagram of an example memory sub-system-bounded memory function executor, in accordance with some embodiments of the present disclosure.

FIG. 3 is a block diagram of an example memory sub-system-bounded memory function executor 300, in accordance with some embodiments of the present disclosure. As shown, the memory sub-system-bounded memory function executor 300 includes a memory function request receiver 310, a bounded memory function performer 312, a memory function status monitor 314, and a request responder 316. For some embodiments, the memory sub-system-bounded memory function executor 300 is implemented as part of a memory sub-system controller (e.g., 115). Additionally, for some embodiments, the composition of a memory sub-system-bounded memory function manager can vary from what is illustrated with respect to FIG. 3.

For some embodiments, the memory function request receiver 310 receives, from a host system (e.g., 120), a memory sub-system command to perform a memory function with respect to a set of memory addresses of a memory sub-system (e.g., 110). The bounded memory function performer 312 performs the memory function within the memory sub-system (e.g., 110) by accessing (e.g., reading data from or writing data to) the at least one memory device (e.g., 130, 140) using a set of memory access operations performed internally within the memory sub-system. The memory function status monitor 314 determines whether performance of the memory function has ended. In response to determining that performance of the memory function has ended, the request responder 316 sends (or causes the sending of) a response to the host system (e.g., 120) that indicates a performance status of the memory function.

Figure 4:
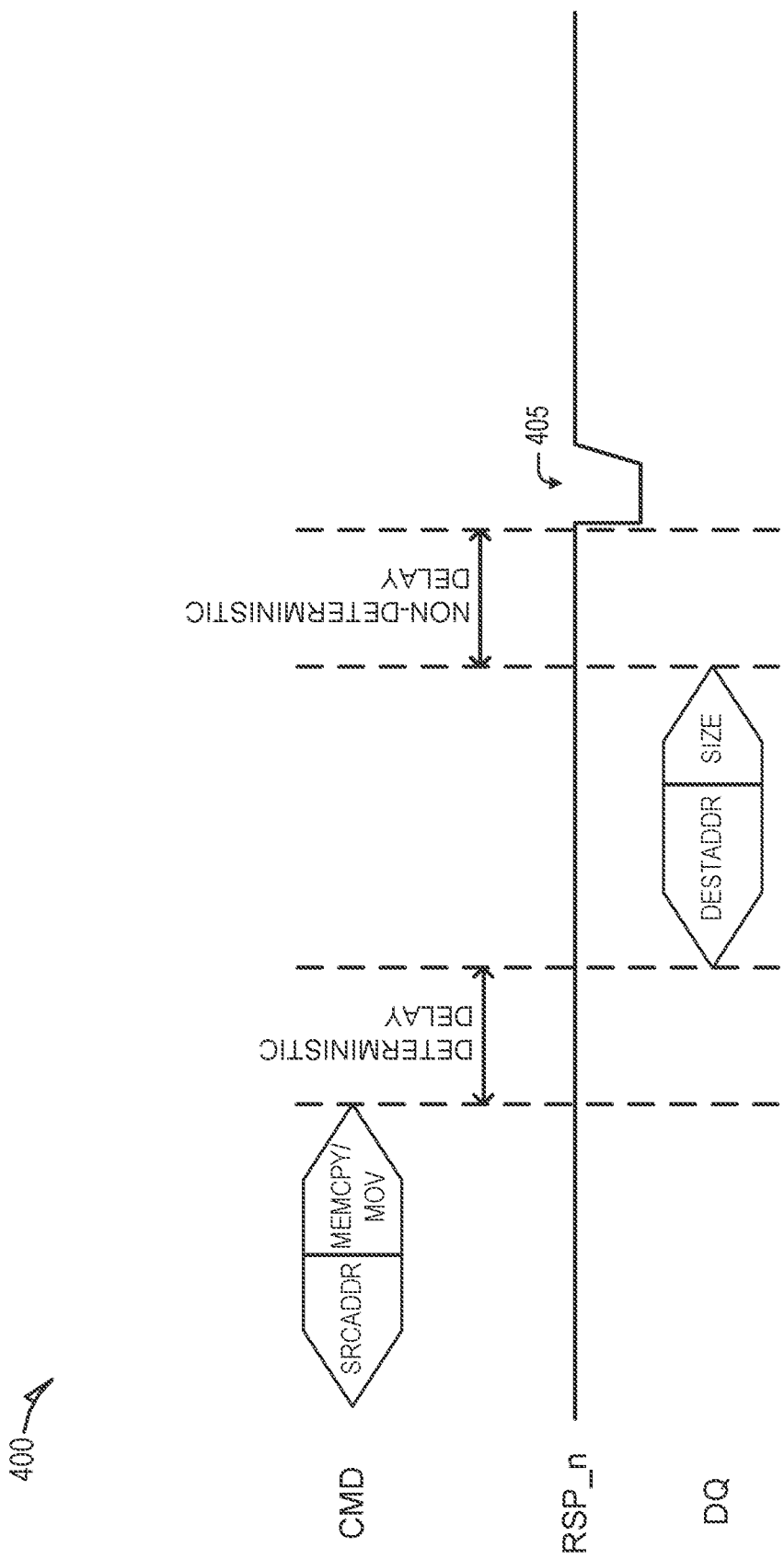
FIGS. 4 through 7 are diagrams illustrating example memory protocols by which a host system requests execution of example memory sub-system-bounded memory functions with respect to a memory sub-system, in accordance with some embodiments of the present disclosure.

FIGS. 4 through 7 are diagrams illustrating example memory protocols by which a host system requests execution of example memory sub-system-bounded memory functions with respect to a memory sub-system, in accordance with some embodiments of the present disclosure. In particular. FIG. 4 illustrates an example memory sub-system command, in accordance with an example NVDIMM-P memory protocol 400, by which a host system (e.g., 120) requests a memory sub-system (e.g., 110) to execute a memory sub-system-bounded memory copy function or a memory sub-system-bounded memory move function. As shown, the requested memory copy function involves a source memory address (SRCADDR), a command encoding corresponding to the requested memory function (MEMCPY/MEMMOV), a destination memory address (DESTADDR), and data size (SIZE). The memory copy function (or memory move function) is requested by a host system sending to the memory sub-system: SRCADDR and command encoding corresponding to the memory copy function (MEMCPY) (or the memory move function (MEMMOVE)) on a command (CMD) signal line; and DESTADDR and SIZE on the data (DQ) signal line. The DESTADDR and SIZE can be sent on the data (DQ) signal line after a deterministic delay that follows the sending of the SRCADDR and the command encoding (MEMCPY/MEMMOV) on the command (CMD) signal line. The sending of the SRCADDR, MEMCPY/MEMMOV, DESTADDR, and SIZE via the CMD and DQ signal lines represent the sending of an example memory sub-system command to request a memory copy function/memory move function in accordance with the example NVDIMM-P memory protocol 400. After non-deterministic delay, the memory sub-system responds with a signal 405 on the RSP_n signal line to indicate to the host system that performance of the requested memory copy function (or the requested memory move function) has ended.

Figure 5:
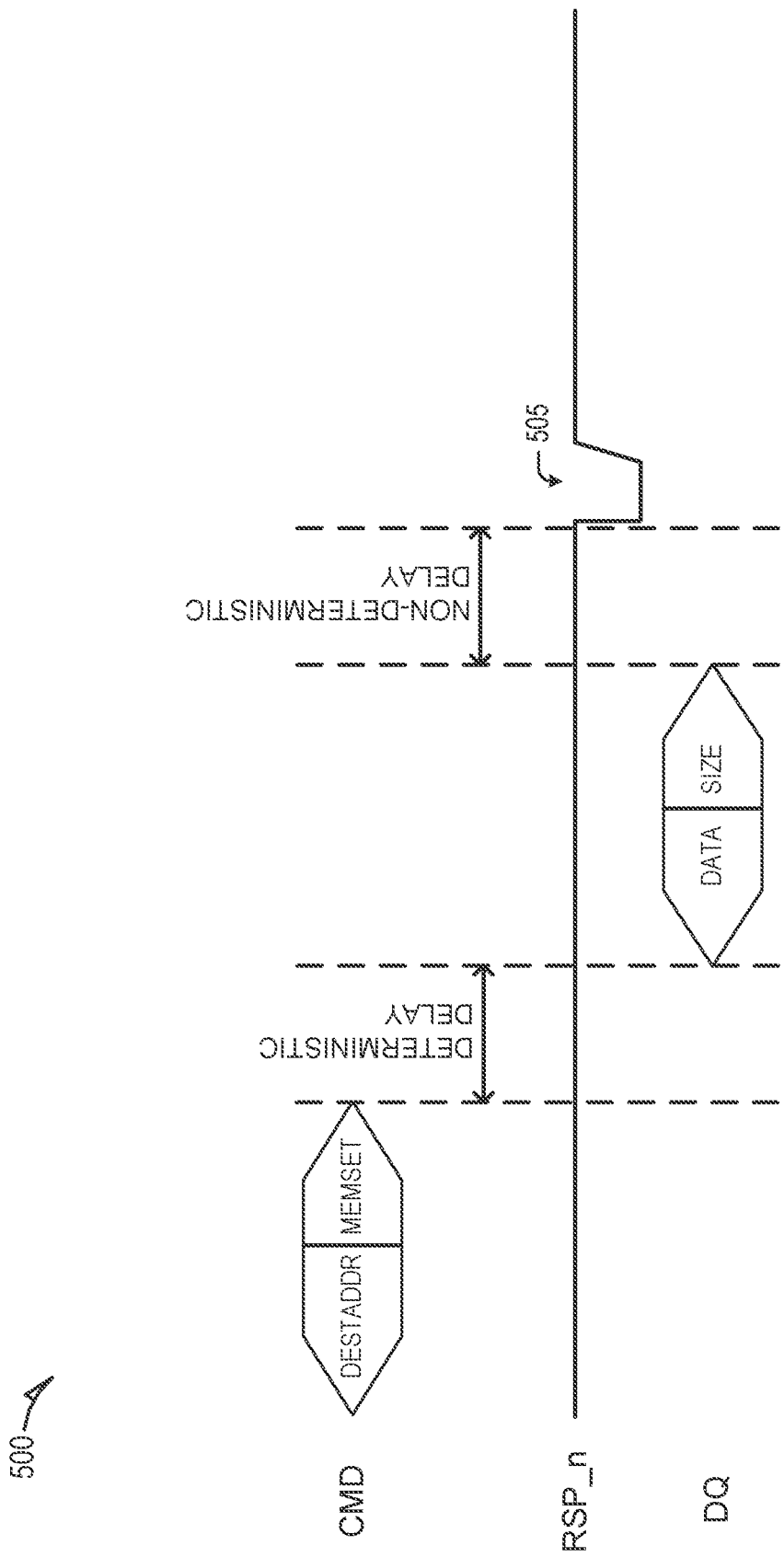

In particular. FIG. 5 illustrates an example memory sub-system command, in accordance with an example NVDIMM-P memory protocol 500, by which a host system (e.g., 120) requests a memory sub-system (e.g., 110) to execute a memory sub-system bounded memory set function. As shown, the requested memory set function involves a destination memory address (DESTADDR), a command encoding corresponding to the requested memory set function (MEMSET), specified data (DATA) to be used for filling a block of memory space, and data size (SIZE). The memory set function is requested by a host system sending to the memory sub-system: DESTADDR and command encoding corresponding to the memory set function (MEMSET) on a command (CMD) signal line; and DATA and SIZE on the data (DQ) signal line. The DATA and SIZE can be sent on the data (DQ) signal line after a deterministic delay that follows the sending of the DESTADDR and the command encoding (MEMSET) on the command (CMD) signal line. The sending of the DESTADDR, MEMSET, DATA, and SIZE via the CMD and DQ signal lines represent the sending of an example memory sub-system command to request a memory set function in accordance with the example NVDIMM-P memory protocol 500. After non-deterministic delay, the memory sub-system responds with a signal 505 on the RSP_n signal line to indicate to the host system that performance of the requested memory set function has ended.

Figure 6:
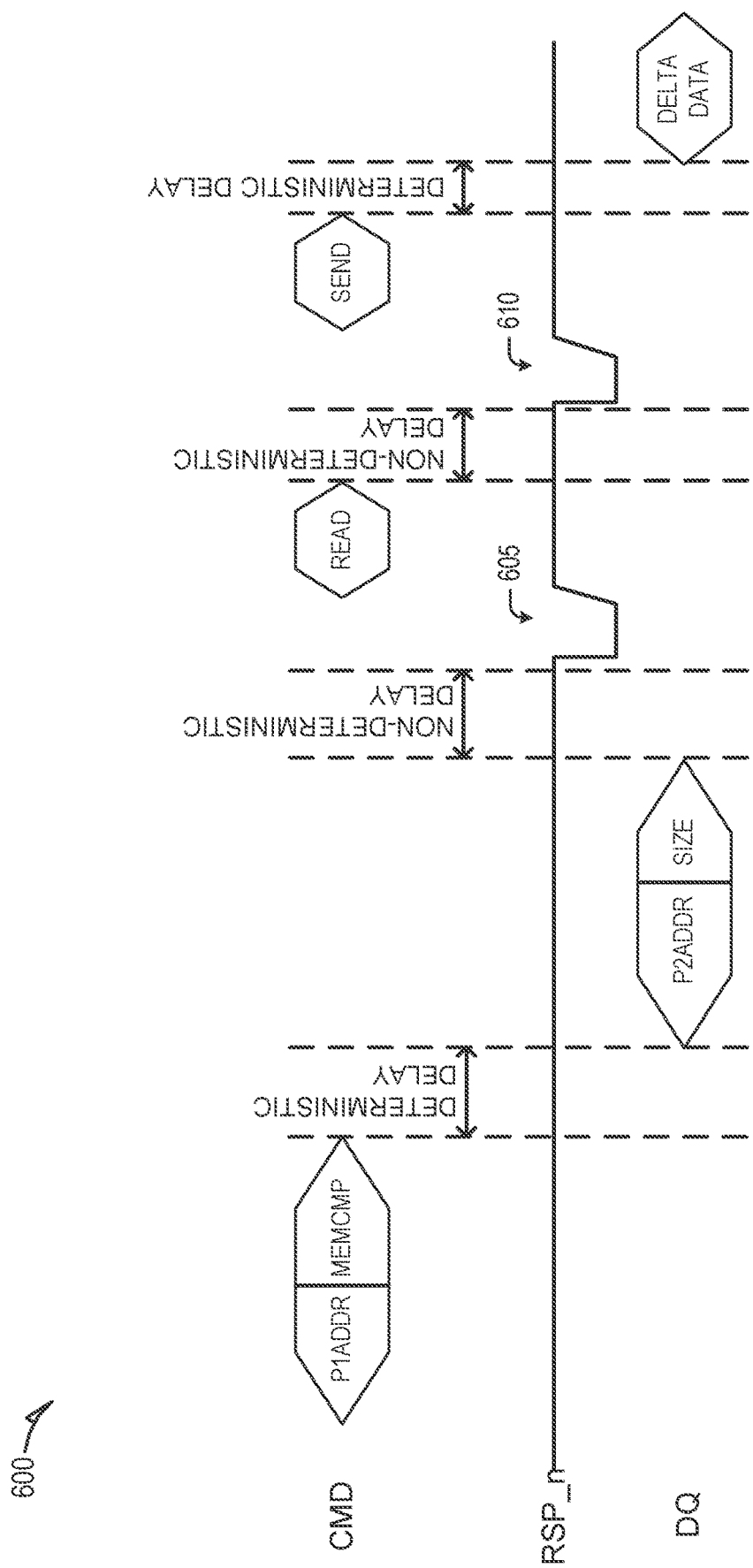

In particular, FIG. 6 illustrates an example memory sub-system command, in accordance with an example NVDIMM-P memory protocol 600, by which a host system (e.g., 120) requests a memory sub-system (e.g., 110) to execute a memory sub-system bounded memory compare function. As shown, the requested memory compare function involves a first memory address (P1ADDR), a command encoding corresponding to the requested memory compare function (MEMCMP), a second memory address (P2ADDR), and data size (SIZE). The memory compare function is requested by a host system sending to the memory sub-system: P1ADDR and command encoding corresponding to the memory compare function (MEMCMP) on a command (CMD) signal line; and P2ADDR and SIZE on the data (DQ) signal line. The P2ADDR and SIZE can be sent on the data (DQ) signal line after a deterministic delay that follows the sending of the P1ADDR and the command encoding (MEMCMP) on the command (CMD) signal line. The sending of the P1ADDR, MEMCMP. P2ADDR, and SIZE via the CMD and DQ signal lines represent the sending of an example memory sub-system command to request a memory compare function in accordance with the example NVDIMM-P memory protocol 600.

After non-deterministic delay, the memory sub-system responds with a signal 605 on the RSP_n signal line to indicate to the host system that performance of the requested memory compare function has ended. In response, the host system sends a memory sub-system read command (READ) to the memory sub-system on the command (CMD) signal line. After non-deterministic delay, the memory sub-system responds to the memory sub-system read command (READ) with a signal 610 on the RSP_n signal line, which indicates to the host system that delta data (DELTA DATA) generated by the requested memory compare function is ready to be sent to the host system. In response to the signal 610, the host system sends a memory sub-system send command (SEND) to the memory sub-system, which the memory sub-system responds to by sending the delta data (DELTA DATA) back to the host system on the data (DQ) signal line after a deterministic delay.

Figure 7:
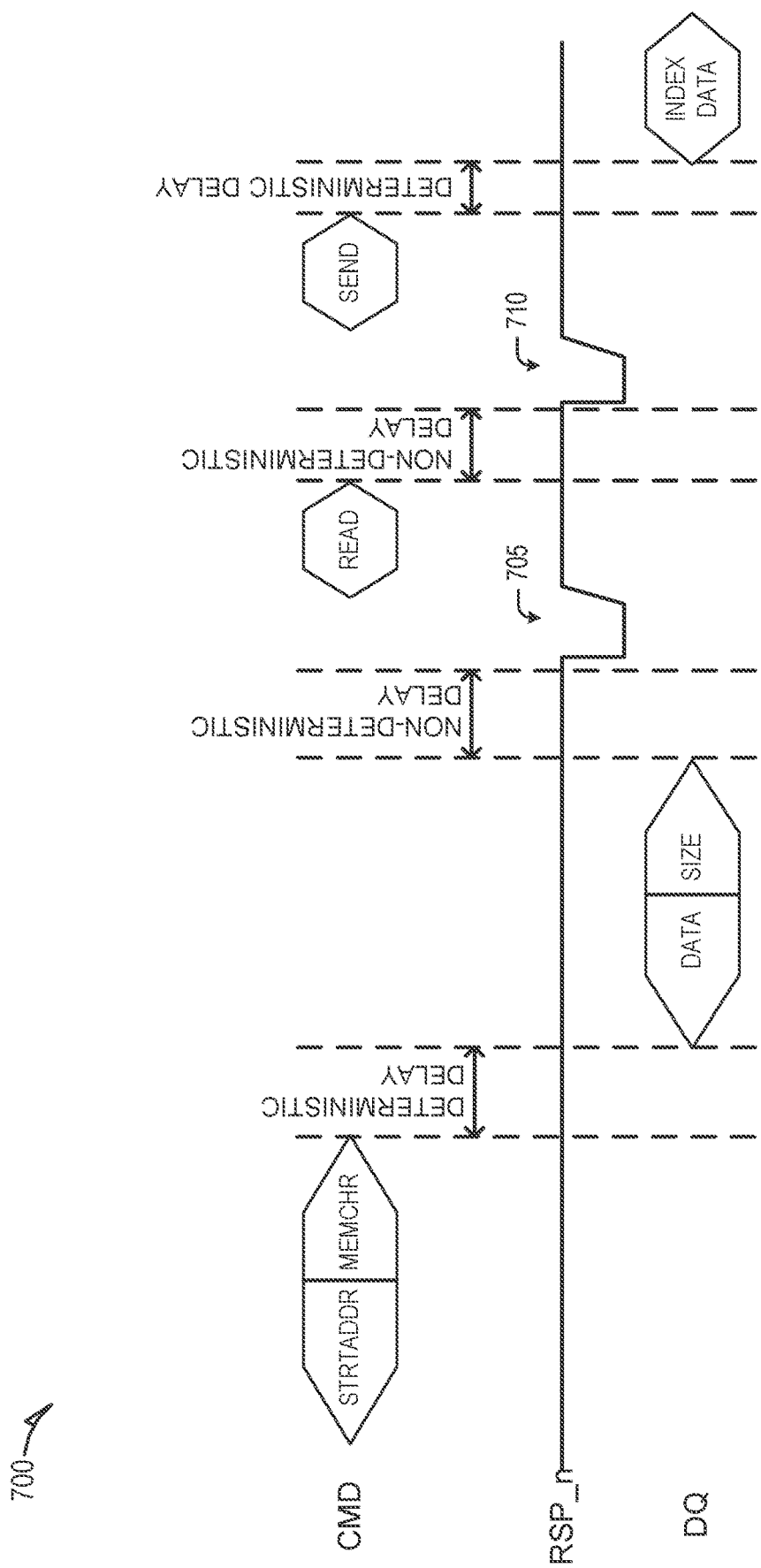

In particular. FIG. 7 illustrates an example memory sub-system command, in accordance with an example NVDIMM-P memory protocol 700, by which a host system (e.g., 120) requests a memory sub-system (e.g., 110) to execute a memory sub-system bounded memory search function. As shown, the requested memory search function involves a start memory address (STRTADDR), a command encoding corresponding to the requested memory search function (MEMCHR), specified data (DATA) being search for, and data size (SIZE). The memory search function is requested by a host system sending to the memory sub-system: STRTADDR and command encoding corresponding to the memory search function (MEMCHR) on a command (CMD) signal line; and DATA and SIZE on the data (DQ) signal line. The DATA and SIZE can be sent on the data (DQ) signal line after a deterministic delay that follows the sending of the STRTADDR and the command encoding (MEMCHR) on the command (CMD) signal line. The sending of the STRTADDR. MEMCHR, DATA, and SIZE via the CMD and DQ signal lines represent the sending of an example memory sub-system command to request a memory search function in accordance with the example NVDIMM-P memory protocol 700.

After non-deterministic delay, the memory sub-system responds with a signal 705 on the RSP_n signal line to indicate to the host system that performance of the requested memory search function has ended. In response, the host system sends a memory sub-system read command (READ) to the memory sub-system on the command (CMD) signal line. After non-deterministic delay, the memory sub-system responds to the memory sub-system read command (READ) with a signal 710 on the RSP_n signal line, which indicates to the host system that index data (INDEX DATA) generated by the requested memory search function is ready to be sent to the host system. In response to the signal 710, the host system sends a memory sub-system send command (SEND) to the memory sub-system, which the memory sub-system responds to by sending the index data (INDEX DATA) back to the host system on the data (DQ) signal line after a deterministic delay.

Figure 8:
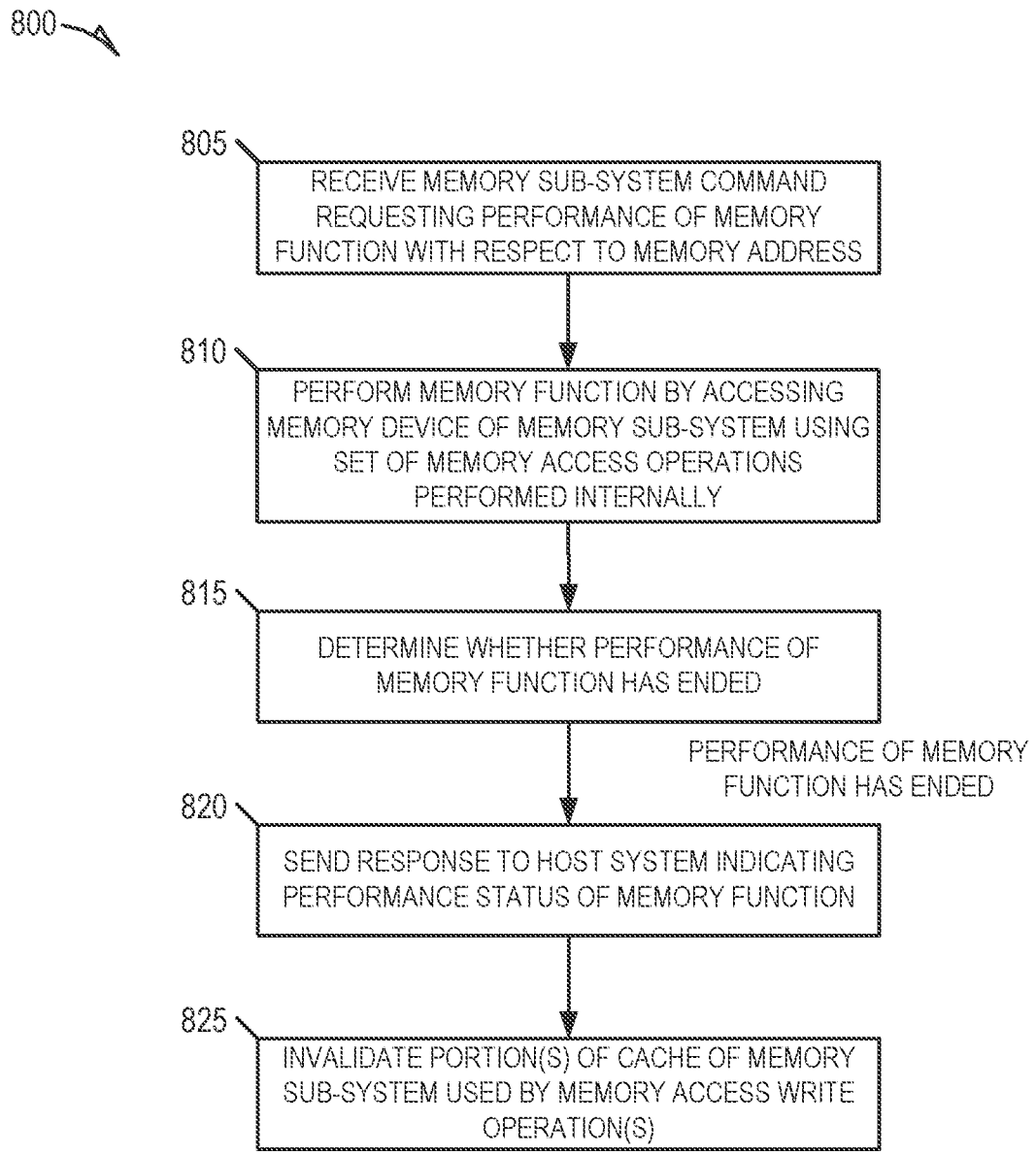
FIGS. 8 and 9 are flow diagrams of example methods for executing a memory function within a memory sub-system, in accordance with some embodiments of the present disclosure.
Figure 9:
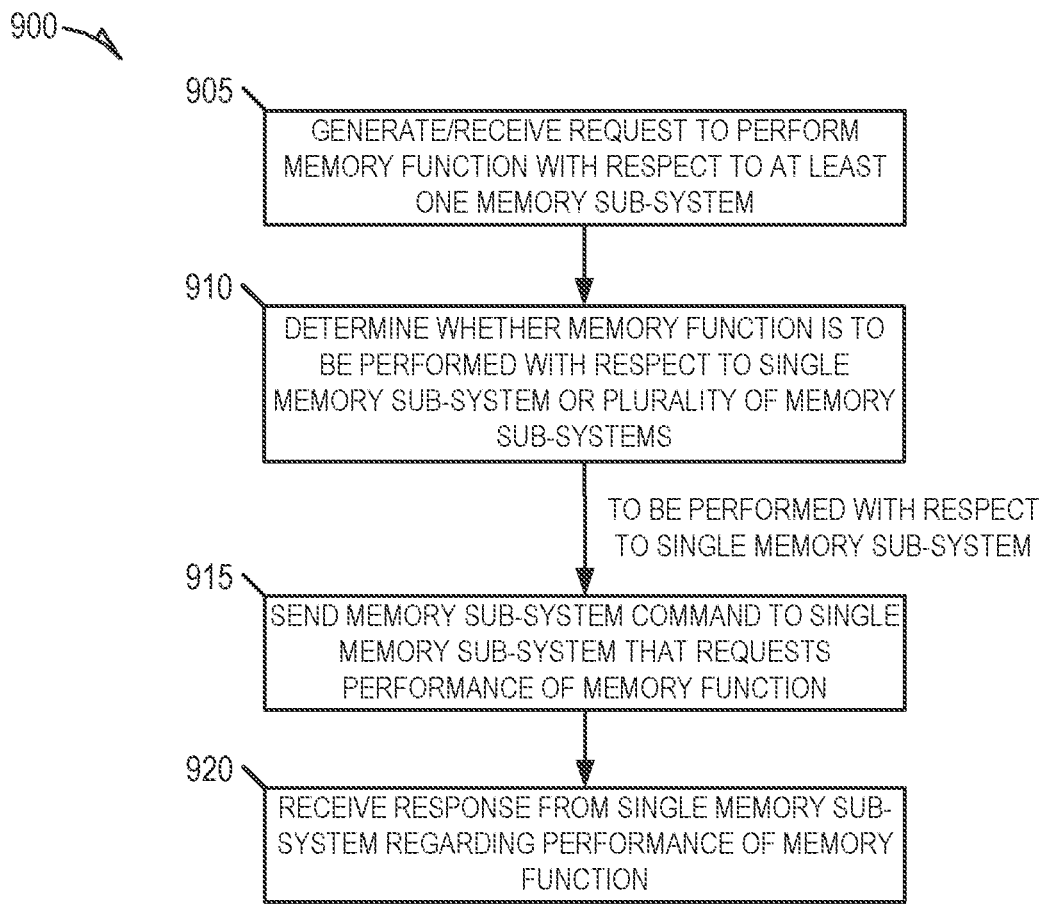

FIGS. 8 and 9 are flow diagrams of example methods for executing a memory function within a memory sub-system, in accordance with some embodiments of the present disclosure. The methods 800, 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the memory sub-system controller 115 of FIG. 1 based on the memory sub-system-bounded memory function executor 113. Additionally, or alternatively, for some embodiments, the method 800 is performed, at least in part, by the host system 120. In some embodiments, the method 900 is performed by the host system 120 based on the memory sub-system-bounded memory function manager 125. Additionally, or alternatively, for some embodiments, the method 900 is performed, at least in part, by the memory sub-system controller 115 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now to the method 800 of FIG. 8, at operation 805, a processing device (e.g., of the memory sub-system controller 115) receives, from a host system (e.g., 120), a memory sub-system command to perform a memory function with respect to a set of memory addresses of a memory sub-system (e.g., 110). For some embodiments, the set of memory addresses can map to at least one memory device (e.g., 130, 140) in a set of memory devices that is included by the memory sub-system. The processing device can receive the memory sub-system command in accordance with a memory protocol, such a non-deterministic memory protocol (e.g., a NVDIMM-P memory protocol). For instance, the memory sub-system command can comprise a new command of the memory protocol that corresponds to one or more memory sub-system-bounded memory functions described herein. Alternatively, receiving the memory sub-system command from the host system (e.g., 120) comprises receiving from the host system a set of memory sub-system commands according to the memory protocol (e.g., XWRITE commands in accordance with a NVDIMM-P memory protocol) that cause a set of data writes to a set of registers of the memory sub-system (e.g., using existing memory sub-system write commands of the memory protocol). The set of data writes can cause the set of registers to store data that specifies, without limitation, the memory function being requested for performance and the set of memory addresses being operated upon by the memory function. The set of registers can comprise reserved memory space on the memory sub-system that map to one or more internal registers of the memory sub-system controller (e.g., 115). As described herein, the memory sub-system can detect (e.g., read) the information stored in the set of registers, and respond by performing the memory sub-system-bounded memory function accordingly. As noted herein, the memory function requested by the memory sub-system command can include, without limitation, a memory copy function, a memory set function, a memory compare function, and a memory search function as described herein.

At operation 810, the processing device performs the memory function (requested by the memory sub-system command received at operation 805) within the memory sub-system (e.g., 110) by accessing (e.g., reading data from or writing data to) the at least one memory device (e.g., 130, 140) using a set of memory access operations performed internally within the memory sub-system. The set of memory access operations can be performed, at least in part, by the memory sub-system controller (e.g., 115) of the memory sub-system. Additionally, as noted herein, the set of memory access operations performed by the memory sub-system to facilitate the memory function do not involve the host system. For some embodiments, one or more of the memory access operations in the set of memory access operations comprise a direct memory access (DMA) operation performed internally (e.g., bounded) within the memory sub-system.

At operation 815, the processing device determines whether performance of the memory function (being performed by operation 810) has ended. In response to determining that performance of the memory function (being performed by operation 810) has ended, at operation 820, the processing device sends (or causes the sending of) a response to the host system (e.g., 120) that indicates a performance status of the memory function. For example, the performance status can comprise an indication to the host system that performance of the memory function has ended. The performance status can comprise an indication of whether performance of the memory function was completed successfully, or ended in failure. The performance status can comprise an indication that data generated by the memory function is ready for retrieval by the host system. For some embodiments, the response comprises a response signal (e.g., RSP_n) in accordance with a memory protocol, such as a non-deterministic memory protocol (e.g., a NVDIMM-P memory protocol).

At operation 825, the processing device invalidates one or more portions of a cache, of the memory sub-system, used by any memory access operation that comprises an internal direct memory access (DMA) write operation. For some embodiments, the invalidation of the one or more portions comprises invalidating one or more cache line sectors of the cache. The cache can comprise one that is present at the frontend of the memory sub-system.

Referring now to the method 900 of FIG. 9, at operation 905, the processing device (e.g., of the host system 120) generates or receives a request to perform a memory function with respect to at least one memory sub-system operatively coupled to the host system. For instance, the request can be generated by or received from a software application operating on the host system. In another instance, the request can be received by the host system from another computing device (e.g., over a communication network).

The request on the host system 120 can be generated or received via a software function call of a memory function. For instance, the software function call for a memory copy function can comprise "memcpy(dest, src, size)." where dest represents a destination memory address, src represents a source memory address, and size represents the amount of data (starting from the source memory address) that is copied from the source memory address to the destination memory address. The software function call for a memory move function can comprise "memmove(dest, src, size)," where dest represents a destination memory address, src represents a source memory address, and size represents the amount of data (starting from the source memory address) that is moved from the source memory address to the destination memory address. The software function call for a memory set function can comprise "memset(dest, data, size)." where dest represents a destination memory address, data represents the specified data that is to be used to fill a block of memory space on the memory sub-system, and size represents the amount of memory space (starting from the destination memory address) that is to be filled with the specified data. The software function call for a memory compare function can comprise "memcmp(p1, p2, size)," where p1 represents a first memory address, p2 represents a second memory address, and size represents the amount of data starting at the first memory address that is compared to data starting at the second memory address. The software function call for a memory search function can comprise "memchr(s, data, size)." where s represents a source memory address, data represents the specified data that is being search for within a window of memory space starting at the source memory address, and size represents the size of the window of memory space that is being searched for the specified data. The software function call for a memory reverse search function can comprise "memrchr(s, data, size)" performed in reverse order to the memory search function described above.

At operation 910, the processing device determines whether the memory function (requested at operation 905) is to be performed with respect to only a single memory sub-system (e.g., a single NVDIMM-P device, which can be represented by 110) coupled to the host system or is to be performed with respect to two or more memory sub-systems (e.g., multiple NVDIMM-P devices) operatively coupled to the host system. For some embodiments, the processing device makes this determination based on one or more memory addresses associated (e.g., provided) with the requested memory function (e.g., one or more memory addresses with which the requested memory function is to be performed).

In response to determining that the memory function is to be performed with respect to only a single memory sub-system (e.g., bounded to the memory sub-system 110), at operation 915, the processing device sends (or causes the sending of) a memory sub-system command to the single memory sub-system (e.g., in accordance with a non-deterministic memory protocol, such as a NVDIMM-P memory protocol) that requests the single memory sub-system to perform the memory function with respect to a set of addresses associated with (e.g., that map to) the single memory sub-system. As described herein, in response to receiving the memory sub-system command from the processing device, the single memory sub-system can perform the memory function in accordance with the method 800 described above with respect to FIG. 8.

At operation 920, the processing device receives a response (e.g., RSP_n in accordance with a NVDIMM-P memory protocol) from the memory sub-system (e.g., 110) that indicates a performance status of the memory function (e.g., performance of memory function completed successfully or failed). For some embodiments, operation 920 occurs after performance of the memory function by the single memory sub-system (e.g., 110) has ended (e.g., either successfully or unsuccessfully).

Figure 10A:
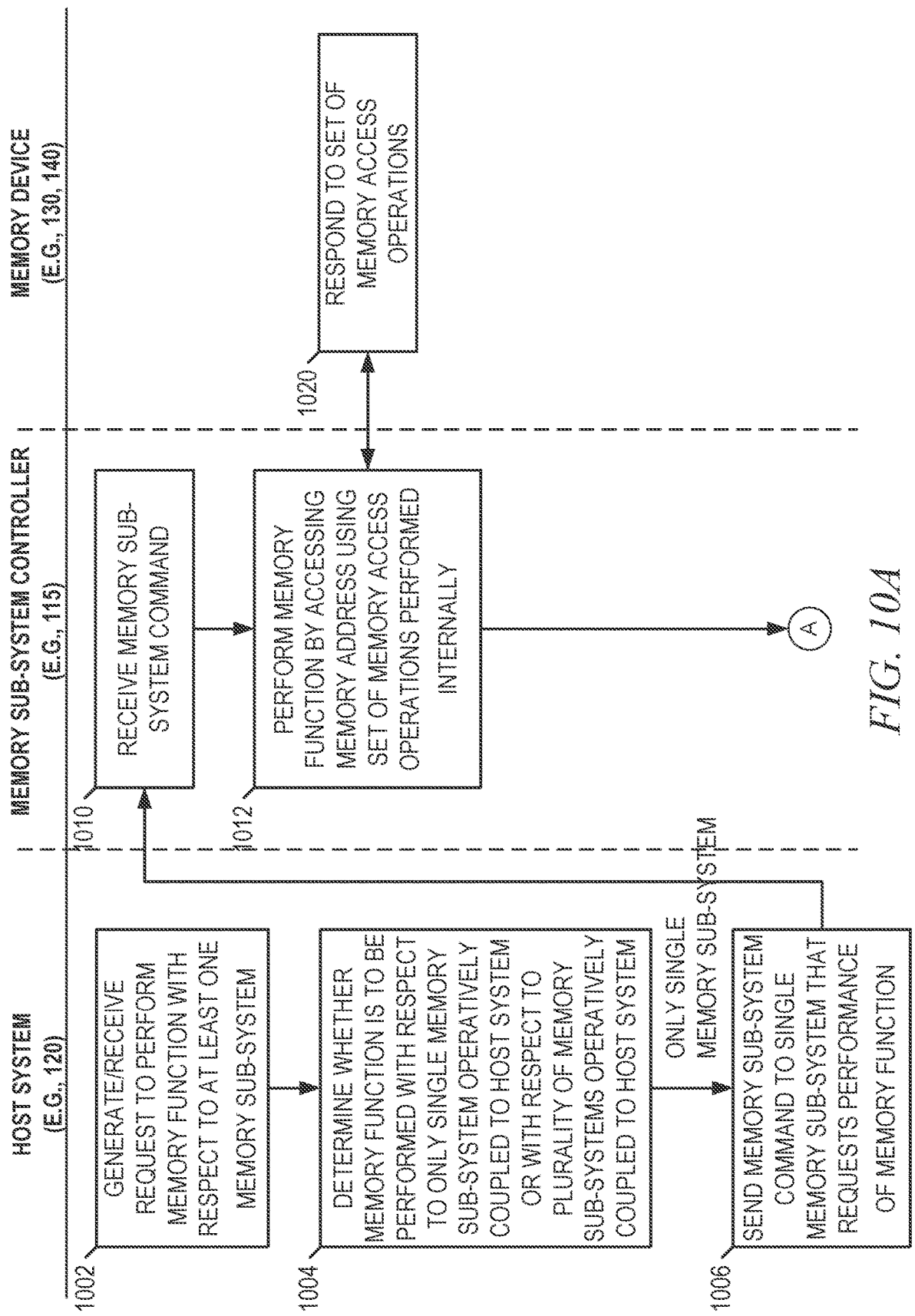
FIGS. 10A and 10B provide an interaction diagram illustrating interactions between components of the computing environment in the context of some embodiments in which a method for executing a memory function within a memory sub-system is performed.
Figure 10B:
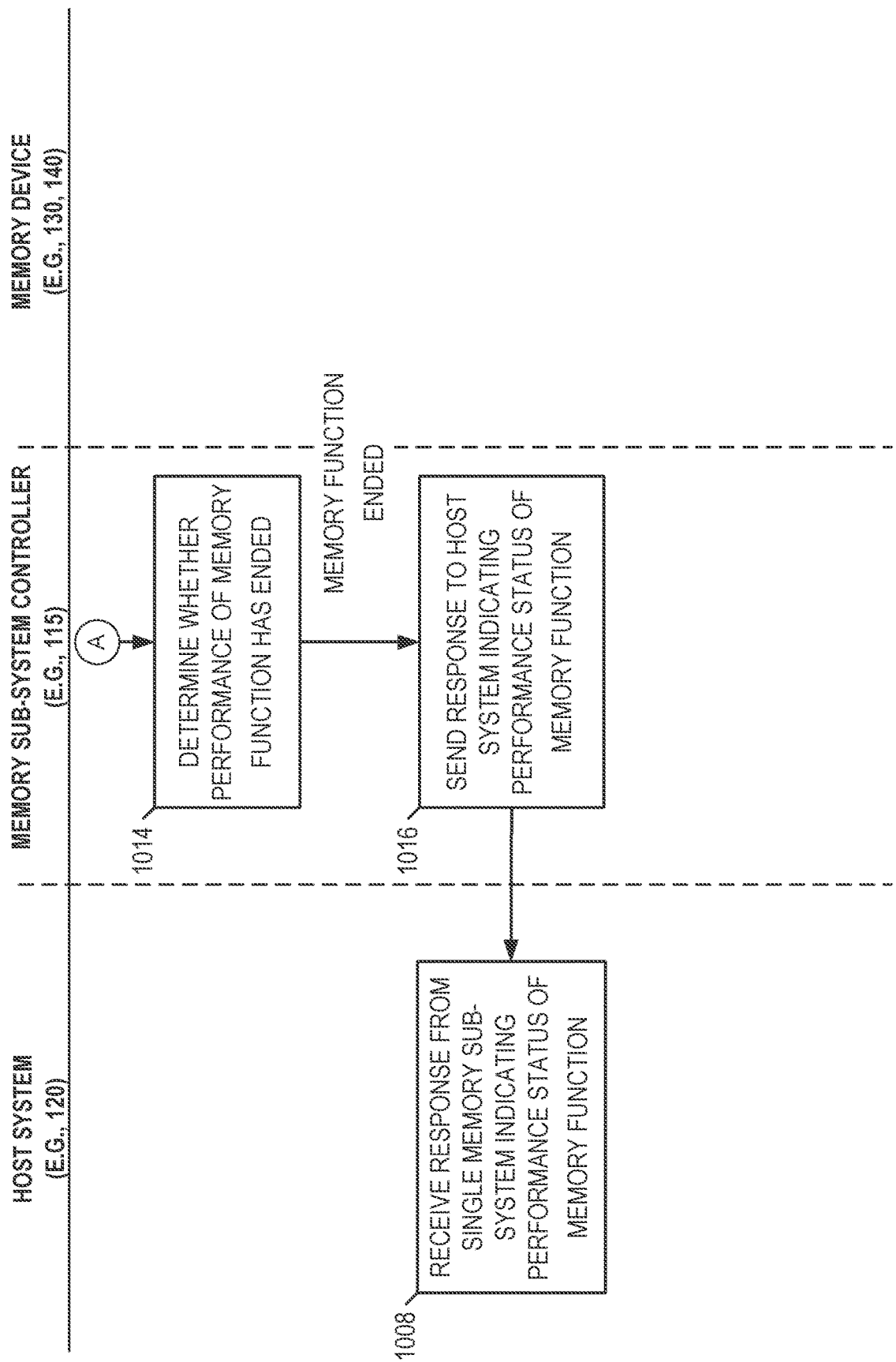

FIGS. 10A and 10B provide an interaction diagram illustrating interactions between components of the computing environment 100 in the context of some embodiments in which a method for executing a memory function within a memory sub-system is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130, 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. In the context of the example illustrated in FIG. 10, the host system can include the host system 120, the memory sub-system controller can include the memory sub-system controller 115, and the memory device can include the memory device 130 or 140.

As shown in FIG. 10A, at operation 1002, the host system 120 generates/receives a request to perform a memory function (e.g., memory copy function, memory move function, memory set function, memory compare function, memory search function) with respect to at least one memory sub-system (e.g., 110). At operation 1004, the host system 120 determines whether the memory function is to be performed with respect to only a single memory sub-system (e.g., a single NVDIMM-P device, which can be represented by 110) coupled to the host system, or is to be performed with respect to two or more memory sub-systems (e.g., multiple NVDIMM-P devices) operatively coupled to the host system. In response to determining that the memory function is to be performed with respect to only a single memory sub-system, at operation 1006, the host system 120 sends (or causes the sending of) a memory sub-system command to the single memory sub-system (e.g., in accordance with a non-deterministic memory protocol, such as a NVDIMM-P memory protocol) that requests the single memory sub-system to perform the memory function with respect to a set of addresses associated with (e.g., that map to) the single memory sub-system.

At operation 1010, the memory sub-system controller 115 (of the memory sub-system 110) receives a request to perform, internally within the bounds of the memory sub-system 110, a memory function for the host system 120. The request can be sent from the host system 120 to the memory sub-system 110 by way of one or more memory sub-system commands from the host system 120 to the memory sub-system 110 in accordance with a memory protocol (e.g., non-deterministic memory protocol) described herein. At operation 1012, the memory sub-system controller 115 performs the requested memory function within the memory sub-system 110 by accessing (e.g., reading data from or writing data to) at least one memory device (e.g., 130, 140) using a set of memory access operations performed internally within the memory sub-system 110. At operation 1020, the memory device (e.g., 130, 140) responds to the set of memory access operations performed by the memory sub-system controller 115.

At operation 1014, the memory sub-system controller 115 determines whether performance of the requested memory function within the memory sub-system 110 has ended. In response to determining that the memory function has ended, at operation 1016, the memory sub-system controller 115 sends (or causes the sending of) a response to the host system 120 that indicates a performance status for the memory function (e.g., completed successfully or ended unsuccessfully). At operation 1008, the host system 120 receives the response from the memory sub-system controller 115 (of the memory sub-system 110).

Figure 11:
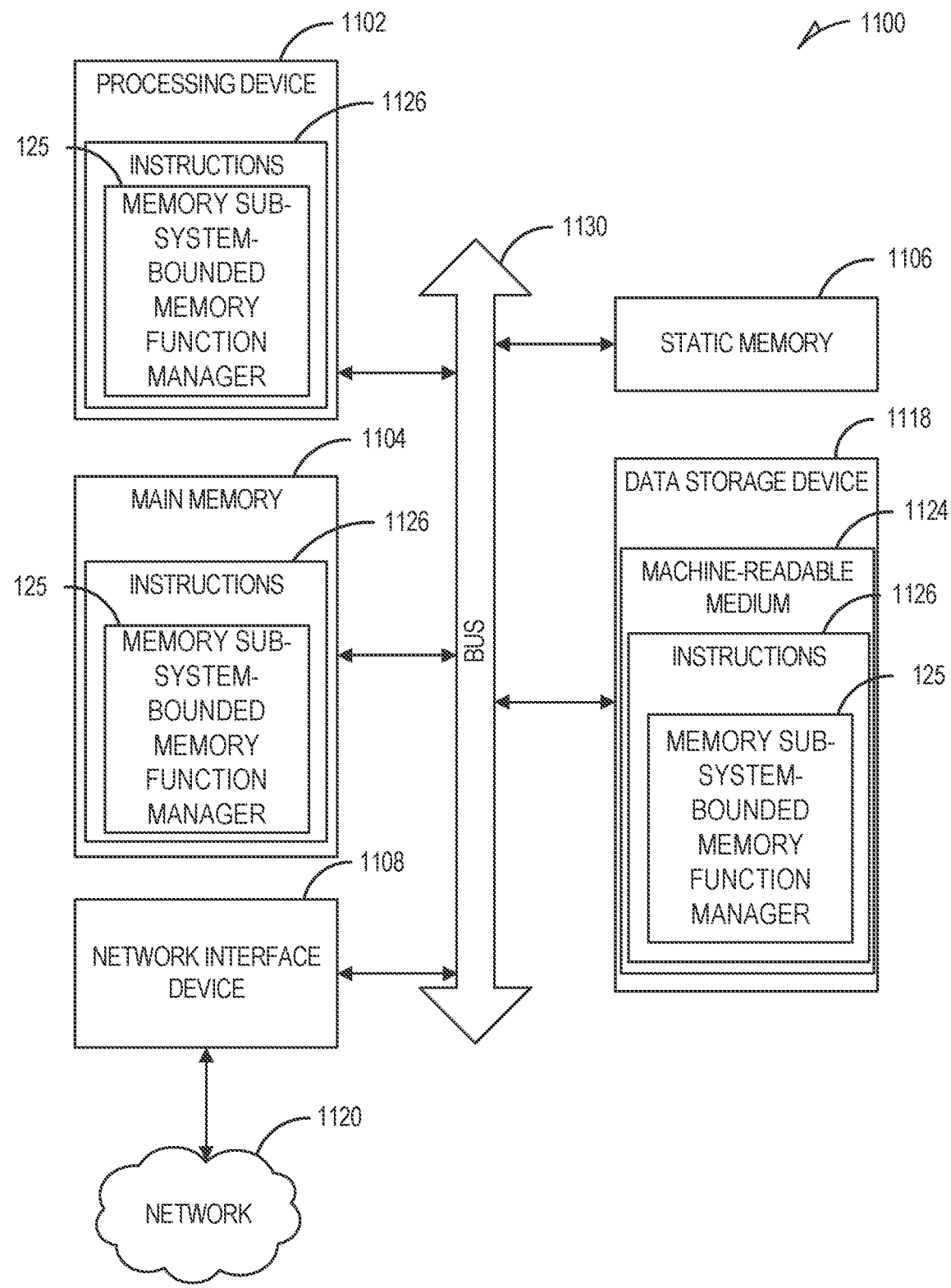
FIG. 11 is a block diagram of an example computer system in which embodiments of the present disclosure may operate.

FIG. 11 illustrates an example machine in the form of a computer system 1100 within which a set of instructions can be executed for causing the machine to perform any one or more of the methodologies discussed herein. In some embodiments, the computer system 1100 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the memory sub-system-bounded memory function manager 125 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1130.

The processing device 1102 represents one or more general-purpose processing devices such as a microprocessor, a central processing unit, or the like. More particularly, the processing device 1102 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1102 can also be one or more special-purpose processing devices such as an application specific integrated circuit (ASIC), a field programmable gate array (FPGA), a digital signal processor (DSP), a network processor, or the like. The processing device 1102 is configured to execute instructions 1126 for performing the operations and steps discussed herein. The computer system 1100 can further include a network interface device 1108 to communicate over a network 1120.

The data storage device 1118 can include a machine-readable storage medium 1124 (also known as a computer-readable medium) on which is stored one or more sets of instructions 1126 or software embodying any one or more of the methodologies or functions described herein. The instructions 1126 can also reside, completely or at least partially, within the main memory 1104 and/or within the processing device 1102 during execution thereof by the computer system 1100, the main memory 1104 and the processing device 1102 also constituting machine-readable storage media. The machine-readable storage medium 1124, data storage device 1118, and/or main memory 1104 can correspond to the memory sub-system 110 of FIG. 1.

In one embodiment, the instructions 1126 include instructions to implement functionality corresponding to executing a memory function within a memory sub-system as described herein (e.g., the memory sub-system-bounded memory function manager 125 of FIG. 1). While the machine-readable storage medium 1124 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

EXAMPLES

Example 1 is a memory sub-system comprising: a set of memory devices; and a memory sub-system controller, operatively coupled to the set of memory devices, configured to perform operations comprising: receiving, from a host system, a memory sub-system command to perform a memory function with respect to a set of memory addresses of the memory sub-system, the set of memory addresses mapping to at least one memory device in the set of memory devices; performing the memory function within the memory sub-system by accessing the at least one memory device using a set of memory access operations performed internally within the memory sub-system without interaction with the host system; determining whether performance of the memory function has ended; and in response to determining that performance of the memory function has ended, sending a response to the host system that indicates a performance status of the memory function.

In Example 2, the subject matter of Example 1 optionally includes where the set of memory access operations comprise at least one direct memory access operation.

In Example 3, the subject matter of Example 1 or Example 2 optionally includes where the memory function comprises a memory copy function requesting the memory sub-system to copy data from a source memory address of the memory sub-system to a destination memory address of the memory sub-system, the set of memory access operations comprising a first subset of memory access operations to read at least a portion of the data from the source memory address and a second subset of memory access operations to write at least the portion of the data to the destination memory address.

In Example 4, the subject matter of any one of Examples 1 to 3 optionally includes where both the source memory address and the destination memory address map to a single memory device in the set of memory devices.

In Example 5, the subject matter of any one of Examples 1 to 4 optionally includes where the source memory address maps to a first memory device in the set of memory devices, and the destination memory address maps to a second memory device in the set of memory devices.

In Example 6, the subject matter of any one of Examples 1 to 5 optionally includes where the memory function comprises a memory set function requesting the memory sub-system to fill a block of memory space, starting at a destination memory address of the memory sub-system, with data specified by the memory sub-system command, the set of memory access operations comprising a memory access operation to write at least a portion of the data to the destination memory address.

In Example 7, the subject matter of any one of Examples 1 to 6 optionally includes where the memory function comprises a memory compare function requesting the memory sub-system to compare first data to second data, the first data being stored starting at a first memory address of the memory sub-system, the second data being stored starting at a second memory address of the memory sub-system, and the set of memory access operations comprising a first memory access operation to read the first data from the first memory address and a second memory access operation to read the second data from the second memory address.

In Example 8, the subject matter of any one of Examples 1 to 11 optionally includes where the memory function comprises a memory search function requesting the memory sub-system to performs a search for data specified by the memory sub-system command, the search starting at a source memory address of the memory sub-system, and the set of memory access operations comprising a memory access operation to read data from the source memory address.

In Example 9, the subject matter of any one of Examples 1 to 8 optionally includes where the memory sub-system command is received from the host system according to a non-deterministic memory protocol.

In Example 10, the subject matter of any one of Examples 1 to 9 optionally includes where the non-deterministic memory protocol comprises a Non-Volatile Dual In-Line Memory Module-P (NVDIMM-P) memory protocol.

In Example 11, the subject matter of any one of Examples 1 to 10 optionally includes where the memory sub-system is a Non-Volatile Dual In-Line Memory Module (NVDIMM), and the memory sub-system further comprises a Dual In-Line Memory Module (DIMM) interface to couple the memory sub-system to the host system.

In Example 12, the subject matter of any one of Examples 1 to 11 optionally includes where the memory sub-system further comprises: a set of registers, wherein the receiving the memory sub-system command that requests performance of the memory function comprises: receiving, from the host system, a set of memory sub-system commands that cause a set of data writes to the set of registers, the set of memory sub-system commands being sent to the memory sub-system according to a memory protocol, and the set of data writes causing the set of registers to store data that specifies the set of memory addresses and that specifies the memory function being requested for performance.

Example 13 is a method comprising: generating or receiving, on a host system, a request to perform a memory function with respect to at least one memory sub-system operatively coupled to the host system; determining, by the host system, whether the memory function is to be performed with respect to only a single memory sub-system operatively coupled to the host system or with respect to a plurality of memory sub-systems operatively coupled to the host system; in response to determining that the memory function is to be performed with respect to only the single memory sub-system: sending, from the host system to the single memory sub-system, a memory sub-system command that requests performance of the memory function with respect to a set of memory addresses of the single memory sub-system, the single memory sub-system being configured to perform the memory function by accessing at least one memory device of the memory sub-system using a set of memory access operations performed internally within the memory sub-system without interaction with the host system; and receiving, at the host system, a response from the single memory sub-system that indicates a performance status of the memory function.

In Example 14, the subject matter of Example 13 optionally includes where the memory sub-system command is sent to the single memory sub-system according to a non-deterministic memory protocol.

In Example 15, the subject matter of Example 13 or Example 14 optionally includes where the memory sub-system command comprises a memory copy function requesting the memory sub-system to copy data from a source memory address of the memory sub-system to a destination memory address of the memory sub-system, the set of memory access operations comprising a first subset of memory access operations to read a portion of the data from the source memory address and a second subset of memory access operations to write the portion of the data to the destination memory address.

In Example 16, the subject matter of any one of Examples 13 to 15 optionally includes where the memory sub-system command comprises a memory set function requesting the memory sub-system to fill a block of memory space, starting at a destination memory address of the memory sub-system, with data specified by the memory sub-system command, the set of memory access operations comprising a memory access operation to write at least a portion of the data to the destination memory address.

In Example 17, the subject matter of any one of Examples 13 to 16 optionally includes where the memory sub-system command comprises a memory compare function requesting the memory sub-system to compare first data to second data, the first data being stored starting at a first memory address of the memory sub-system, the second data being stored starting at a second memory address of the memory sub-system, and the set of memory access operations comprising a first memory access operation to read the first data from the first memory address and a second memory access operation to read the second data from the second memory address.

In Example 18, the subject matter of any one of Examples 13 to 17 optionally includes where the memory sub-system command comprises a memory search function requesting the memory sub-system to perform a search for data specified by the memory sub-system command, the search starting at a source memory address of the memory sub-system, and the set of memory access operations comprising a memory access operation to read data from the source memory address.

In Example 19, the subject matter of any one of Examples 13 to 18 optionally includes where the sending a memory sub-system command that requests performance of the memory function comprises: sending, to the single memory sub-system, a set of memory sub-system commands that cause a set of data writes to a set of registers of the memory sub-system, the set of memory sub-system commands being sent to the memory sub-system according to a memory protocol, and the set of data writes causing the set of registers to store data that specifies the set of memory addresses and that specifies the memory function being requested for performance.

Example 20 is a non-transitory computer-readable storage medium comprising instructions that, when executed by a processing device, cause the processing device to perform operations comprising: determining whether a memory function is to be performed with respect to only a single memory sub-system operatively coupled to the processing device or with respect to a plurality of memory sub-systems operatively coupled to the processing device; in response to determining that the memory function is to be performed with respect to only the single memory sub-system: sending, to the single memory sub-system, a memory sub-system command that requests performance of the memory function with respect to a set of addresses of the single memory sub-system, the single memory sub-system being configured to perform the memory function by accessing at least one memory device of the memory sub-system using a set of memory access operations performed internally within the memory sub-system without interaction with the processing device; and receiving a response from the single memory sub-system that indicates a performance status of the memory sub-system command.

What is claimed is:

1. A non-volatile dual in-line memory module (NVDIMM) comprising:
a set of memory devices; and
a processing device, operatively coupled to the set of memory devices; configured to perform operations comprising:
receiving, from a host system, a NVDIMM command to perform a memory function with respect to a set of memory addresses of the NVDIMM, the NVDIMM command being received from the host system according to a NVDIMM-P protocol, the set of memory addresses mapping to at least one memory device in the set of memory devices; and
in response to the NVDIMM command:
performing the memory function within the NVDIMM by accessing the at least one memory device using a set of memory access operations performed internally within the NVDIMM without interaction with the host system;
determining whether performance of the memory function has ended; and
in response to determining that performance of the memory function has ended, sending a response to the host system that indicates a performance status of the memory function.

2. The NVDIMM of claim 1, wherein the set of memory access operations comprise at least one direct memory access operation.

3. The NVDIMM of claim 1, wherein the memory function comprises a memory copy function requesting the NVDIMM to copy data from a source memory address of the NVDIMM to a destination memory address of the NVDIMM, the set of memory access operations comprising a first subset of memory access operations to read at least a portion of the data from the source memory address and a second subset of memory access operations to write at least the portion of the data to the destination memory address.

4. The NVDIMM of claim 3, wherein both the source memory address and the destination memory address map to a single memory device in t set of memory devices.

5. The NVDIMM of claim 3, wherein the source memory address maps to a first memory device in the set of memory devices, and the destination memory address maps to a second memory device in the set of memory devices.

6. The NVDIMM of claim 1, wherein the memory function comprises a memory set function requesting the NVDIMM to fill a block of memory space, starting at a destination memory address of the NVDIMM, with data specified by the NVDIMM command, the set of memory access operations comprising a memory access operation to write at least a portion of the data to the destination memory address.

7. The NVDIMM of claim 1, wherein the memory function comprises a memory compare function requesting the NVDIMM to compare first data to second data, the first data being stored starting at a first memory address of the NVDIMM, the second data being stored starting at a second memory address of the NVDIMM, and the set of memory access operations comprising a first memory access operation to read the first data from the first memory address and a second memory access operation to read the second data from the second memory address.

8. The NVDIMM of claim 1, wherein the memory function comprises a memory search function requesting the NVDIMM to perform a search for data specified by the NVDIMM command, the search starting at a source memory address of the NVDIMM, and the set of memory access operations comprising a memory access operation to read data from the source memory address.

9. The NVDIMM of claim 1, comprises a Dual In-Line Memory Module (DIMM) interface to couple the NVDIMM to the host system.

10. The NVDIMM of claim 1, comprising:
a set of registers, wherein the receiving the NVDIMM command that requests performance of the memory function comprises:
receiving, from the host system, a set of NVDIMM commands that cause a set of data writes to the set of registers, the set of NVDIMM commands being sent to the NVDIMM according to a memory protocol, and the set of data writes causing the set of registers to store data that specifies the set of memory addresses and that specifies the memory function being requested for performance.

11. A method comprising:
receiving, at a non-volatile dual in-line memory module (NVDIMM) from a host system, a NVDIMM command to perform a memory function with respect to a set of memory addresses of the NVDIMM, the NVDIMM command being received from the host system according to a NVDIMM-P protocol, the set of memory addresses mapping to at least one memory device of the NVDIMM;
performing the memory function within the NVDIMM by accessing the at least one memory device using a set of memory access operations performed internally within the NVDIMM without interaction with the host system;
determining, by the NVDIMM, whether performance of the memory function has ended; and
in response to determining that performance of the memory function has ended, sending a response from the NVDIMM to the host system that indicates a performance status of the memory function.

12. A method comprising:
generating or receiving, on a host system, a request to perform a memory function with respect to at least one memory sub-system operatively coupled to the host system;
determining, by the host system, whether the memory function is to be performed with respect to only a single memory sub-system operatively coupled to the host system or with respect to a plurality of memory sub-systems operatively coupled to the host system;
in response to determining that the memory function is to be performed with respect to only the single memory sub-system:
sending, from the host system to the single memory sub-system, a memory sub-system command that requests performance of the memory function with respect to a set of memory addresses of the single memory sub-system, the single memory sub-system being configured to perform the memory function by accessing at least one memory device of the memory sub-system using a set of memory access operations performed internally within the memory sub-system without interaction with the host system; and receiving, at the host system, a response from the single memory sub-system that indicates a performance status of the memory function.

13. The method of claim 12, wherein the memory sub-system command is sent to the single memory sub-system according to a non-deterministic memory protocol.

14. The method of claim 12, wherein the memory sub-system command comprises a memory copy function requesting the memory sub-system to copy data from a source memory address of the memory sub-system to a destination memory address of the memory sub-system, the set of memory access operations comprising a first subset of memory access operations to read a portion of the data from the source memory address and a second subset of memory access operations to write the portion of the data to the destination memory address.

15. The method of claim 12, wherein the memory sub-system command comprises a memory set function requesting the memory sub-system to fill a block of memory space, starting at a destination memory address of the memory sub-system, with data specified by the memory sub-system command, the set of memory access operations comprising a memory access operation to write at least a portion of the data to the destination memory address.

16. The method of claim 12, wherein the memory sub-system command comprises a memory compare function requesting the memory sub-system to compare first data to second data, the first data being stored starting at a first memory address of the memory sub-system, the second data being stored starting at a second memory address of the memory sub-system, and the set of memory access operations comprising a first memory access operation to read the first data from the first memory address and a second memory access operation to read the second data from the second memory address.

17. The method of claim 12, wherein the memory sub-system command comprises a memory search function requesting the memory sub-system to perform a search for data specified by the memory sub-system command, the search starting at a source memory address of the memory sub-system, and the set of memory access operations comprising a memory access operation to read data from the source memory address.

18. The method of claim 12, wherein the sending a memory sub-system command that requests performance of the memory function comprises:

sending, to the single memory sub-system, a set of memory sub-system commands that cause a set of data writes to a set of registers of the memory sub-system, the set of memory sub-system commands being sent to the memory sub-system according to a memory protocol, and the set of data writes causing the set of registers to store data that specifies the set of memory addresses and that specifies the memory function being requested for performance.

19. A non-transitory computer-readable storage medium comprising instructions that, when executed by a processing device, cause the processing device to perform operations comprising determining whether a memory function is to be performed with respect to only a single memory sub-system operatively coupled to the processing device or with respect to a plurality of memory sub-systems operatively coupled to the processing device;

in response to determining that the memory function is to be performed with respect to only the single memory sub-system:

sending, to the single memory sub-system, a memory sub-system command that requests performance of the memory function with respect to a set of addresses of the single memory sub-system, the single memory sub-system being configured to perform the memory function by accessing at least one memory device of the memory sub-system using a set of memory access operations performed internally within the memory sub-system without interaction with the processing device; and receiving a response from the single memory sub-system that indicates a performance status of the memory sub-system command.

* * * * *

UNITED STATES PATENT AND TRADEMARK OFFICE
CERTIFICATE OF CORRECTION

PATENT NO. : 11,163,486 B2  
APPLICATION NO. : 16/694427  
DATED : November 2, 2021  
INVENTOR(S) : Bavishi et al.

Page 1 of 1

It is certified that error appears in the above-identified patent and that said Letters Patent is hereby corrected as shown below:

In the Claims

In Column 23, Line 16, in Claim 1, delete "devices;" and insert --devices,-- therefor In Column 23, Line 51, in Claim 4, delete "in t" and insert --in the-- therefor In Column 26, Line 20, in Claim 19, after "comprising", insert --:--

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*